March 2, 1954        G. MINGLE        2,671,212
HIGHWAY WARNING SIGNAL
Filed Dec. 5, 1950
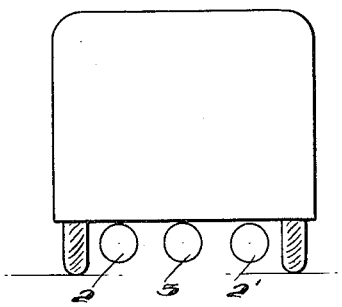
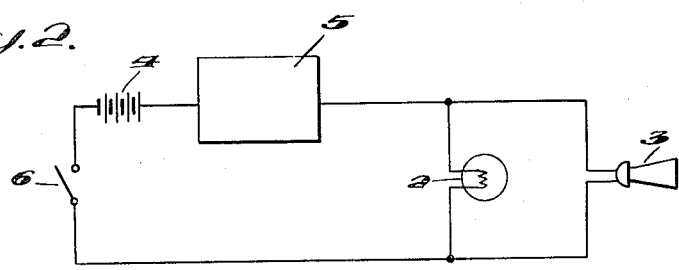
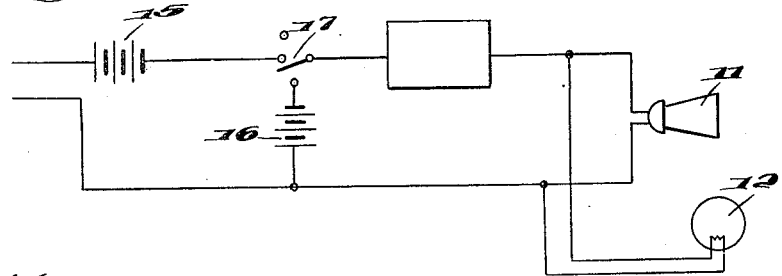
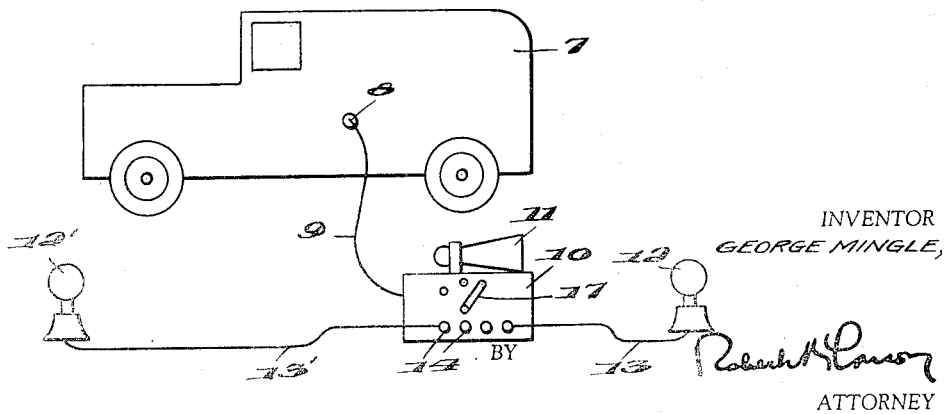
INVENTOR
GEORGE MINGLE,
BY
ATTORNEY Patented Mar. 2, 1954

2,671,212

UNITED STATES PATENT OFFICE 2,671,212

HIGHWAY WARNING SIGNAL

George Mingle, Columbus, Ohio

Application December 5, 1950, Serial No. 199,295

2 Claims. (Cl. 340—366)

This invention relates to visual and audible signals for use with vehicles traveling and parked on highways thoroughfares and the like.

I have found that a great number of accidents are caused by motorists colliding with the rear end of parked or slowly moving vehicles. Many such accidents occur at night or in foggy weather when the visibility is poor and the motorist has insufficient warning of the vehicle ahead. Other of these accidents occur during the daytime as a result of the vehicle ahead being hidden from the oncoming motorist by physical obstructions such as hills and curves in the road.

A different type of accident is caused by the motorist backing up and running into pedestrians or small children who cannot be seen by the motorist as he drives in reverse.

It is an object of this invention to provide an intermittently operating visible and audible signal attached to the rear of a vehicle.

Another object of the invention is to provide a signal arrangement as referred to above including means enabling the vehicle operator to set the signal in operation by a manual switch, or by application of the hand or foot brake, or by shifting the vehicle into reverse.

Another object is to provide a light, powered from a vehicle, which will flash brightly on the road when placed a few feet to the rear of the vehicle.

Another object of the invention is to provide a visible and audible signal to be placed near and about a parked vehicle. Such a signal can be carried conveniently by highway patrol cars and used to warn motorists of other vehicles which have been involved in collisions along the side of the road. A further use for the invention is with maintenance trucks for power and telephone companies as they work during night time emergencies.

Another object of the invention is to provide a portable signal device operable either from the power supply of the parked vehicle or from an auxiliary power supply contained in the unit.

A further object of the invention is to provide the portable signal device with long flexible leads so that the actual signaling means may be placed at the most advantageous positions along the road.

These and other objects will become apparent by reference to the accompanying drawings in which:

Figure 1 is a diagrammatic view of the rear of the vehicle provided with the invention;

Figure 2 is a diagrammatic view of an electric circuit for the signal;

Figure 3 is a diagrammatic view of the side of the vehicle and the portable warning device; and Figure 4 is a diagrammatic view of another embodiment of the electric circuit.

Referring to Fig. 1 lamps 2 and 2' are attached to vehicle 1 at a position near the bottom of the body of the vehicle. A horn 3 is placed between the two lamps. It is to be understood that the positioning of the horn and lamps permits a great deal of variation without going beyond the scope of the invention. An important variation is the addition of a third lamp (not shown) or the adjustment of one of the lamps 2, 2' to cause a brightly shining spot on the road a few feet behind the vehicle.

An electrical circuit for causing the operation of the signal described above is shown in Fig. 2. The horn 3 and lamps 2 (only one of which lamps is shown) are connected in parallel across the power supply 4 which, in the preferred embodiment, is the vehicle battery. An automatic switching mechanism 5 is connected in series with the battery. The function of the switching mechanism 5 is to cause current to flow from the power supply 4 at regular intermittent intervals to the lamps and horn. The switching mechanism may be of the bi-metal type which is normally closed but which breaks the circuit after the flow of current heats the bi-metallic element, causing it to bend away from its contact. Alternatively the switching mechanism may comprise a small motor, and brushes contacting a commutator wheel rotated by the motor. The brushes will be connected to the main circuit and will make and break the circuit according to the rotation of the commutator wheel. By use of this arrangement, the circuits of the lamp and horn respectively can be opened and closed alternatively if that is desired.

In addition to the automatic switching mechanism a second switch 6 is placed in series with the battery, the purpose of this switch is to control the energization of the circuit. This switch can be placed on the dash board and operated manually, or can be coupled with either the hand brake or foot brake for operation thereby. With the addition of a catch or the like, the switch can be arranged to close when the brake is applied, and to stay closed until released manually by the vehicle operator.

In operation, the operator of a school bus, for instance, will approach a stop and close switch 6 thereby energizing the circuit. Automatic switching mechanism 5 will begin making and breaking the circuit causing the lamps and horn to emit visible and audible signals simultaneously and intermittently. When the passengers have alighted and are safely on the curb, the operator can open switch 6 and stop the operation of the warning signal.

Another embodiment of the invention is shown in Fig. 3. In this embodiment a vehicle, such as a maintenance vehicle 7 for a power company or the like, is furnished with an outlet 8 which in turn is connected to the vehicle battery. A long flexible two wire electrical conductor 9 connects outlet 8 to housing 10. The housing contains switching to be described below, an auxiliary power supply, and suitable outlets 14. For convenience, I prefer to mount the horn 11 on the housing 10. As many lamps 12, 12' as desired can be connected to the outlets by means of long flexible conductors 13, 13'. The purpose of the long flexible conductors 9, 13 and 13' is to permit the lamps and horn to be positioned at those locations which will give optimum warning to approaching motorists.

The electrical circuit for the portable device is shown diagrammatically in Fig. 4. The lamps 12 and horn 11 are connected in parallel with the leads to the power supply, and the automatic switching mechanism 5, which has been described above, is connected in series with the power supply. In the embodiment shown in Fig. 4, there are two sources of power, the battery 15 of the vehicle shown at 7 in Fig. 3, and an auxiliary battery 16 contained in the housing 10 of Fig. 3. A switch 17 is mounted on housing 10 and connected in series with the switching mechanism 5. The switch 17 has an "off" position, a second position in which the signal is energized by the vehicle battery 15 and a third position in which the signal is energized by the auxiliary battery.

In operation, a maintenance truck will stop at the place along the highway needing repair work. The crew will set the housing 10 on the highway near the truck with the attached horn directed toward the approaching traffic. The lamps 12, 12' can be set in front of and behind the truck. If necessary the lamps may give a red light. At the discretion of the operator, the signal can be connected to the vehicle battery by means of conductor 9 and outlet 8; or it can be operated from the auxiliary battery. The operator will move switch 17 from off position to the appropriate power supply position (vehicle or auxiliary battery), and switching mechanism will cause the visible and audible means to emit a warning signal at intermittent intervals.

As mentioned before, a highway patrol car could set up the signal in a similar manner at the scene of a night time accident. In that case, probably only the auxiliary battery arrangement would be used.

It is to be understood that the signal could be constructed to operate only from the auxiliary battery or on the other hand, only from the vehicle battery, the combination of the two power supplies not being necessary for the invention.

While I have, in the above description, disclosed what I deem to be practical and efficient embodiment of my invention, it should be well understood that I do not wish to be limited thereto as there might be changes made in the arrangement, disposition and form of the parts without departing from the principle of present invention as comprehended within the scope of the accompanying claims.

I claim:

1. In devices relating to highway signals for warning passing motorists of the presence of a parked vehicle, a visual and audible warning signal, comprising, a housing, a horn mounted on said housing, a plurality of electrical outlets mounted on said housing, jacks removably mounted in said outlets, at least two electric lights, long flexible electric conductors connecting said jacks to said lights, a source of electric power disposed in said housing and connected to said outlets and said horn, and switching mechanism connected to said source of power for causing current to flow regularly intermittently; whereby said horn will sound intermittently to warn passing motorists and said lights can be disposed fore and aft of said parked vehicle to locate the vehicle for the passing motorist.

2. In devices relating to highway signals for warning passing motorists of the presence of a parked vehicle, a visual and audible warning signal, comprising, a housing, a horn mounted on said housing, at least two electric lights, a source of electric power disposed in said housing and connected to said horn, long flexible conductors connecting said lights to said source of power, and switching mechanism connected to said source of power for causing current to flow regularly intermittently; whereby said horn will sound intermittently to warn passing motorists and said lights can be disposed fore and aft of said parked vehicle to locate the vehicle for the passing motorist.

GEORGE MINGLE.

References Cited in the file of this patent

UNITED STATES PATENTS

| Number | Name | Date |
| --- | --- | --- |
| 1,992,775 | Santora | Feb. 26, 1935 |
| 2,165,562 | Mack et al. | July 11, 1939 |
| 2,312,649 | Kelly | Mar. 2, 1943 |
| 2,317,713 | Aufiero | Apr. 27, 1949 |
| 2,491,094 | Du Frane | Dec. 13, 1949 |